(12) United States Patent
Grigoropoulos et al.

(10) Patent No.: US 12,211,365 B2
(45) Date of Patent: Jan. 28, 2025

(54) METHOD AND SYSTEM FOR EMERGENCY RESPONSES BY EVALUATING MEDIA DATA

(71) Applicant: ATOS Public Safety, LLC, Irving, TX (US)

(72) Inventors: Charalampos Grigoropoulos, Chalandri (GR); Michail Sdrallis, Chalandri (GR); Konstantia Markantoni, Metamorfosi (GR); Nikolaos Ploumitsakos, Maroussi (GR); Manfred Kehr, Munich (DE)

(73) Assignee: ATOS Public Safety, LLC

( * ) Notice: Subject to any disclaimer, the term of this patent is extended or adjusted under 35 U.S.C. 154(b) by 350 days.

(21) Appl. No.: 17/888,691

(22) Filed: Aug. 16, 2022

(65) Prior Publication Data

US 2023/0079013 A1    Mar. 16, 2023

(30) Foreign Application Priority Data

Sep. 15, 2021    (EP) .................................... 21196935

(51) Int. Cl.
     *G06V 10/764*      (2022.01)
     *G06F 16/9537*      (2019.01)
     *G06Q 50/26*      (2012.01)
     *G06V 20/50*      (2022.01)
     *G06V 20/60*      (2022.01)
     *G08B 25/00*      (2006.01)

(52) U.S. Cl.
CPC ....... *G08B 25/006* (2013.01); *G06F 16/9537* (2019.01); *G06Q 50/265* (2013.01); *G06V 10/764* (2022.01); *G06V 20/50* (2022.01); *G06V 20/60* (2022.01)

(58) Field of Classification Search
CPC .......................... G08B 25/006; G06F 16/9537; G06Q 50/265; G06V 10/764; G06V 20/50; G06V 20/60
See application file for complete search history.

(56) References Cited

U.S. PATENT DOCUMENTS

| | | | |
|---|---|---|---|
| 11,917,514 B2* | 2/2024 | Martin | .............. H04M 1/72421 |
| 2009/0181640 A1 | 7/2009 | Jones | |
| 2023/0066525 A1* | 3/2023 | Cabanas | ................ H04W 4/029 |

FOREIGN PATENT DOCUMENTS

WO      2021115555 A1    6/2021

OTHER PUBLICATIONS

European Search Report for European Application No. 21196935.7 dated Mar. 2, 2022.

\* cited by examiner

*Primary Examiner* — Phuoc Tran
(74) *Attorney, Agent, or Firm* — MEAGHER EMANUEL LAKS GOLDBERG & LIAO, LLP

(57) ABSTRACT

A method and system for emergency responses can evaluate media data. An appropriate authority device or system can analyze media data such as a picture provided by an eye-witness' device to determine whether emergency relevant objects are visible in the media data and assigns confidence values to them. Furthermore, the location of the objects and the location of the media data can be determined to verify the authenticity of the possible emergency and to respond with the appropriate emergency response.

17 Claims, 5 Drawing Sheets

METHOD AND SYSTEM FOR EMERGENCY RESPONSES BY EVALUATING MEDIA DATA

CROSS-REFERENCE TO RELATED APPLICATIONS

The present application claims priority to European Patent Application No. EP 21 196 935.7 filed on Sep. 15, 2021. The entirety of this European Patent application is incorporated by reference herein.

FIELD

The present invention relates to a method and system for emergency responses by evaluating media data.

BACKGROUND

New emergency call systems such as Next Generation 911 (NG 911) in North America or Next Generation 112 (NG 112) in Europe will need to be able to handle media data. This is useful, for example, when eyewitnesses quickly take media data like a picture or video of an emergency or an emergency scene and pass it on to a responsible emergency authority. This allows the emergency response agency to receive additional information about the emergency in the form of media data. However, it may also happen that only signs of an emergency are visible to an eyewitness who cannot say for sure whether it is a real emergency or not.

For example, areas across the globe with dry climate are threatened from forest fires destroying the vital oxygen production and reduction of carbon dioxide for the citizens. A wildfire, bushfire or forest fire is an unplanned, unwanted, uncontrolled fire in an area of combustible vegetation starting in rural as well as in urban areas.

Fast and effective detection is a key factor in wildfire fighting. Early detection efforts were focused on an early response, accurate results in both daytime and nighttime, and the ability to prioritize fire danger. Local societies and fire fighters are trying to prevent forest damages from fires by spending time on special watchtowers trying to detect smoke from a potential fire. People hiking in the mountains during the dry season are also helping towards this direction. However, an issue that arises is how can someone walking on a forestall area and looking at some smoke a few kilometers ahead be sure that this is a real fire and not the smoke of a chimney from a house, canteen, or restaurant. Many times, pedestrians and/or hikers can see smoke, but due to the distance or a low visibility, it is not easy to recognize that it is a real fire. Hence, the event is forgotten for a while until the flames can be clearly visible.

SUMMARY

None of the methods in the state of the art describe such scenarios where eyewitnesses or other persons are taking a picture or video of a sign or an object of a potential emergency, although they could not identify if it is a real emergency or just false alarm due to a false positive determination. Inventions available in the state of the art are analyzing an image to find out if there is a sign of emergency, e.g. smoke, so as to send help. Given the workload of rescue professionals, and also from an economic point of view, it is not practical to send rescue personnel at every potential sign of a threat. On the other hand, of course, no time should be wasted when it comes to a real emergency. Therefore, the safe identification of potential indications of emergency is of crucial importance.

Therefore, embodiments of our method and system for emergency responses by evaluating media data can be configured to analyze a sign of a potential emergency with a certain confidence which allows that the response to that event is reliable and as fast as possible. Media data can also be analyzed to get the location of an emergency related object.

Embodiments of a method for emergency responses by evaluating media data can include detecting a potential emergency related object in an area and in a proximity to a person, capturing, with an electronic device, media data of the potential emergency related object and sending the media data together with the metadata of the media data location, if available, to an appropriate authority. The method can also include determining and classifying an emergency relevant object in the media data, and assigning an emergency relevant object confidence value to the emergency relevant object, if no emergency relevant object is determined or the emergency relevant object confidence value is lower than a predefined value, adding, by the appropriate authority, a standard incident together with the media data to an emergency database, and ending the method; otherwise determining a location of the emergency relevant object, if no location of the emergency relevant object is determined, assigning a location confidence value of zero; otherwise calculating a location confidence value, if the location confidence value is zero or lower than a predefined value, and creating a new incident case together with the media data and all available confidential values.

According to a preferred embodiment, after the step of calculating a location confidence value, the method can also include determining if a known incident in a certain proximity to the location of the emergency relevant object is present on the basis of comparative data from an emergency database, if no known incident is determined, assigning a proximity confidence value of zero, and creating, by the appropriate authority, a new incident case and adding it together with the media data and all available confidence values to an emergency database and ending the method.

According to another preferred embodiment, after the step of determining, if a known incident in a certain proximity to the location of the emergency relevant object is present, the method can include: calculating a proximity confidence value, if the proximity confidence value is greater than a predefined value, and adding, by the appropriate authority, the media data and all available confidence values to the already known incident in the emergency database and ending the method.

According to a preferred embodiment of the method, the emergency relevant object is at least one of smoke, heat, fire, abnormal water level, flood, avalanche, riot, robbery, storm, earthquake, tornado, wind pant, acts of war or other natural disasters.

According to another preferred embodiment of the method, the area is at least one of forest, bushland, combustible vegetation, seaside, river side, dessert, mountain, grassland, lake side, town, city or wasteland.

According to still another preferred embodiment of the method, the metadata further comprising a proximity sector or an angle of view of the electronic device.

Further, according to a preferred embodiment of the method, the electrical device is a smartphone, tablet, smartwatch, smart glass or any other appropriate equipped device which is configured to send data to the appropriate authority (ap).

According to yet another preferred embodiment of the method, in case the metadata comprising the media data location, the method can also include, after the first step (or other step) determining, by the appropriate authority, if a known incident in a certain proximity of the media data location is present on the basis of comparative data from an emergency database; and, if a known incident is present, and calculating, a first confidence value; otherwise, if no known incident is present, assigning a first confidence value of zero.

According to yet another preferred embodiment of the method, in case the metadata comprising the media data location, the method can also include after the first step or other step: determining, by the appropriate authority, if a known incident in a certain proximity of the media data location is present on the basis of comparative data from a social media network database; and if a known incident is present, and calculating, a second confidence value, otherwise, if no known incident is present assigning a second confidence value of zero.

According to yet another preferred embodiment of the method, the steps determining and calculating the first confidence value and the second confidence value are performed in parallel or in sequence.

According to yet another preferred embodiment of the method, adding and/or weighting the first confidence value, the second confidence value, the emergency relevant objects confidence value, the location of the emergency relevant objects confidence value and/or the proximity confidence value.

According to yet another preferred embodiment of the method, wherein, if the location confidence value is lower than a predefined value, the method can also include contacting a asking a person to take a second media data of the emergency relevant object with a certain distance m to the media data location, and then calculating the location of the emergency relevant object using the second media data and/or a different calculation method.

According to yet another preferred embodiment of the method, wherein, after creating the new incident case, the method can also include checking, by the appropriate authority, using a map query, which buildings are in the vicinity of the new incident case and contacting and asking via call, SMS, Short Message Service, or IVR, Interactive Voice Response, if the owner of the building can confirm the new incident case; and/or determining, by the appropriate authority, using a cell tower query, which mobile devices of other persons are in the vicinity of the new incident case, and contacting and asking via call, SMS or IVR, if the other persons can confirm the new incident case; and/or dispatching, by the appropriate authority, a drone, or personnel to confirm the new incident case, and, if the new incident is confirmed; and/or increasing, by the element of the appropriate authority, the priority of the new incident case, if the new incident is confirmed.

According to yet another preferred embodiment of the method, all confident values are scaled to a value from 0 to 100, wherein a value of zero means no confidence, and a value of 100 means extremely confident.

A system for emergency responses by evaluating media data is also provided. Embodiments of the system can be configured to facilitate performance of an embodiment of the method or be employed to practice an embodiment of the method. The system can include one or more machine devices that can be configured to perform the steps of an embodiment of the method, for example.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed. The invention and embodiments thereof will be described below in further detail in connection with the drawings.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Figure 1:
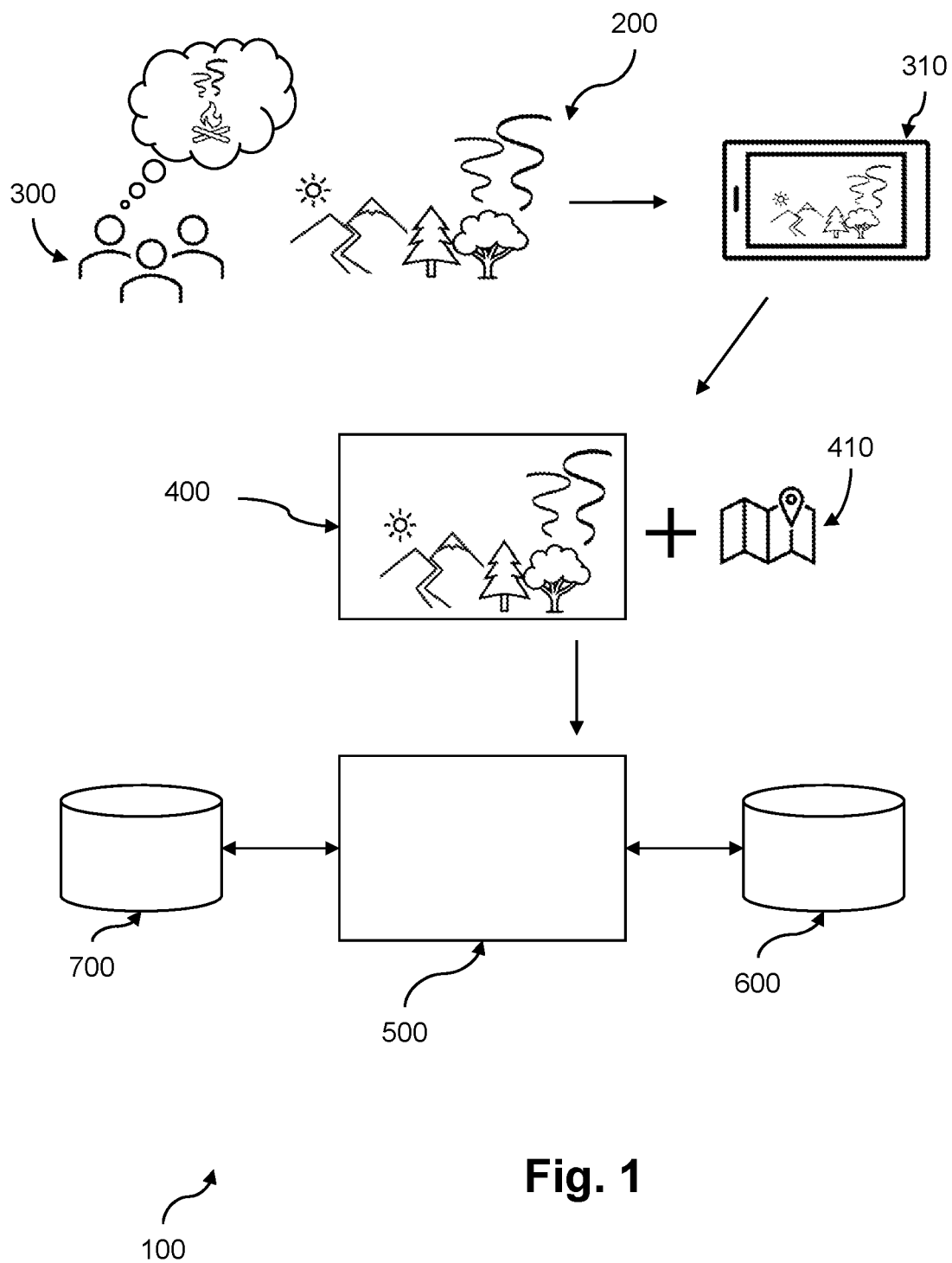
FIG. 1 shows a schematic illustration of the system for emergency responses by evaluating media data according to a first embodiment of the invention.

Reference numerals included in the drawing include the following:
100 system
200 emergency relevant object
210 location of the emergency relevant object
300 person/eyewitness
310 electronic device
400 media data
410 location of the media data
500 appropriate authority
600 emergency database
700 social media database
IKN known incident
prox proximity d distance d from known incident (IKN) to location of the media data (410)
m distance m from location of the media data (410) to a new location of person (300)
maf media data area factor
CV confidence value
CV ero emergency relevant object confidence value
CV Lero location of the emergency relevant object
CV prox proximity confidence value
CV first a first confidence value
CV second a second confidence value
S1-S13" steps of the method

DETAILED DESCRIPTION

Figure 7:
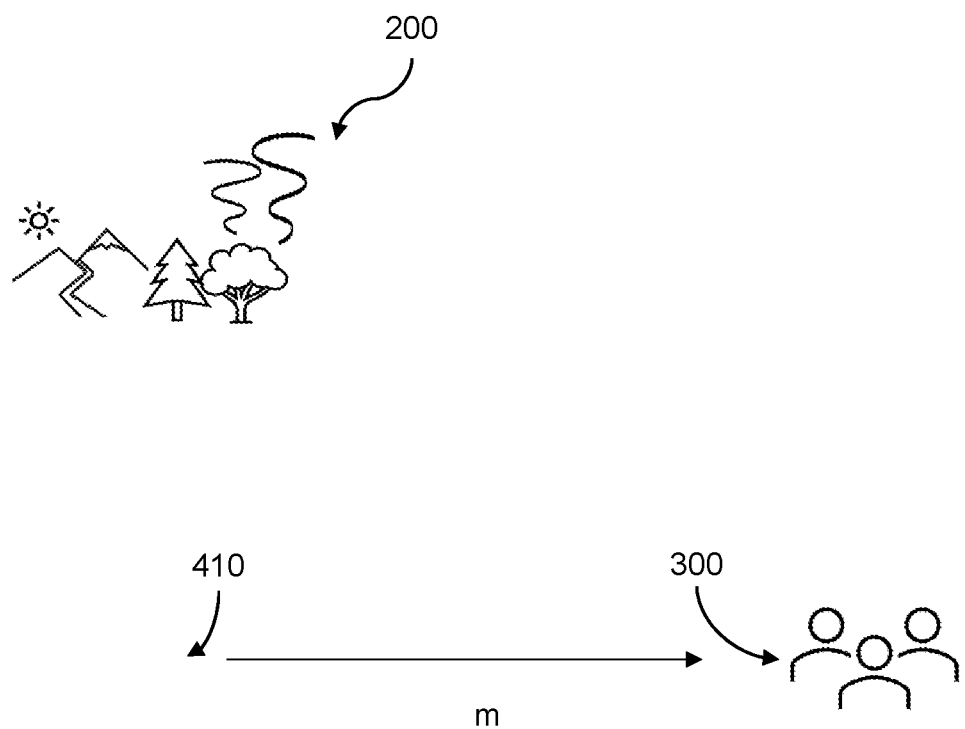
FIG. 7 shows a schematic illustration of a second media data of the emergency relevant object with a certain distance m to the media data location according to an embodiment of the invention.

FIG. 1 schematically shows the system of the invention. A group of people 300 are walking in a forested area and think they see an emergency related object 200. The persons think that it could be an open fire because they can only see the smoke, but they do not know anything about the actual cause of the smoke. Therefore, one person of this group takes media data 400 in form of a picture with his or her smartphone 310. The user device can be another type of electrical telecommunication device that has a processor connected to non-transitory memory and at least one transceiver as well (e.g. a tablet, a laptop computer, etc.). Of course, in accordance with the invention, other media data can also be applied, such as videos, etc. They send this media data 400 together with the meta data of the position of the picture 410 to a responsible appropriate authority 500 (FIG. 7 illustrates an example of media data that can be provided). This appropriate authority 500 evaluates now, automatically or semi-automatically, the media data 400 and its location data 410 with the help of different databases 600, 700, in order to verify whether the media data 400 is genuine and whether actually an emergency is present. The appropriate authority 500 can make this evaluation via a server device or other type of computer device, for example. The appropriate authority device can include a processor connected to non-transitory memory and at least one transceiver for communicative connections to user devices or other devices to provide telecommunication services as discussed herein, for example. If there is indeed an emergency, appropriate help measures can be taken immediately.

Figure 2A:
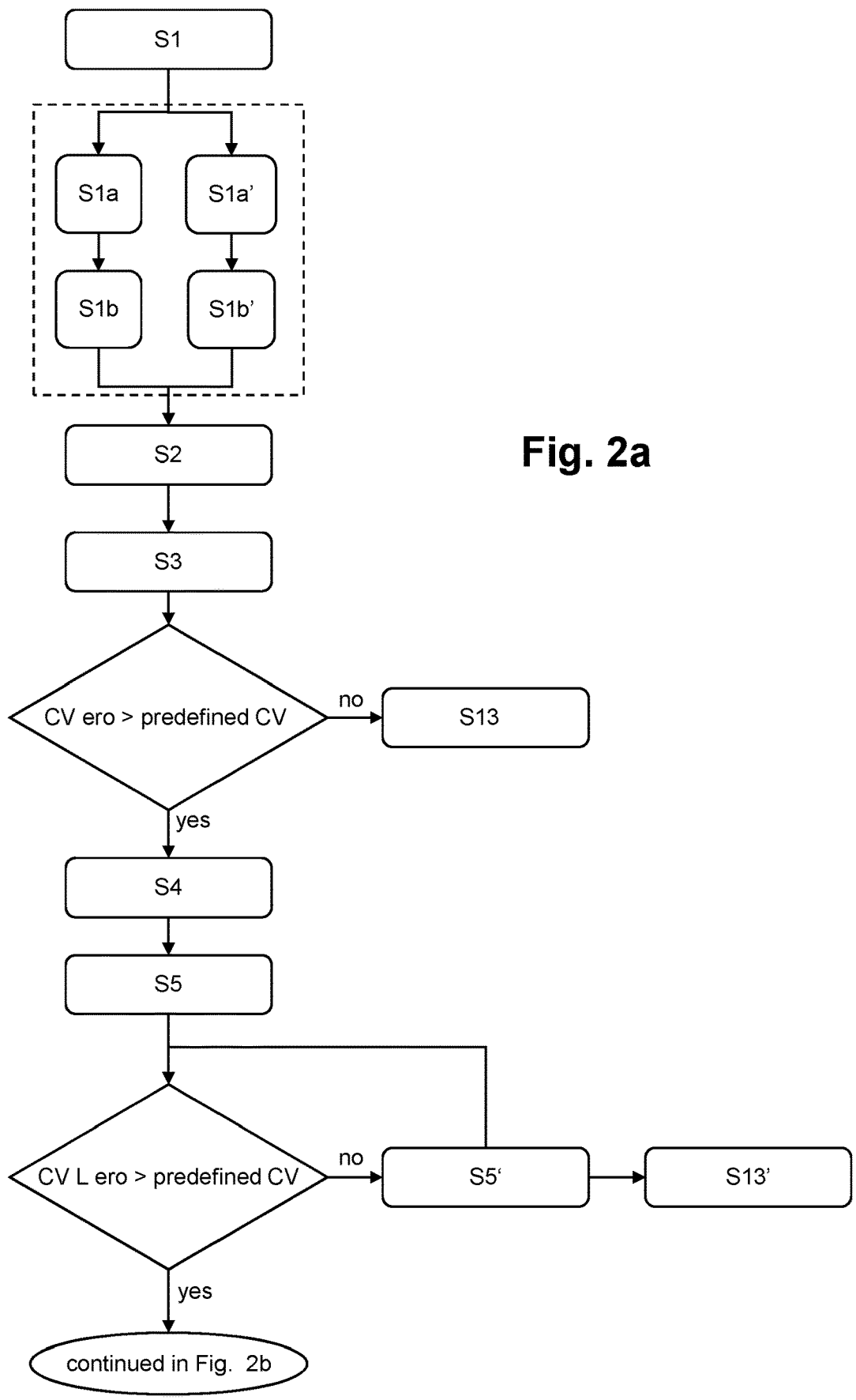
FIG. 2a shows a flowchart of a portion of the method for emergency responses by evaluating media data according to a second embodiment of the invention.
Figure 2B:
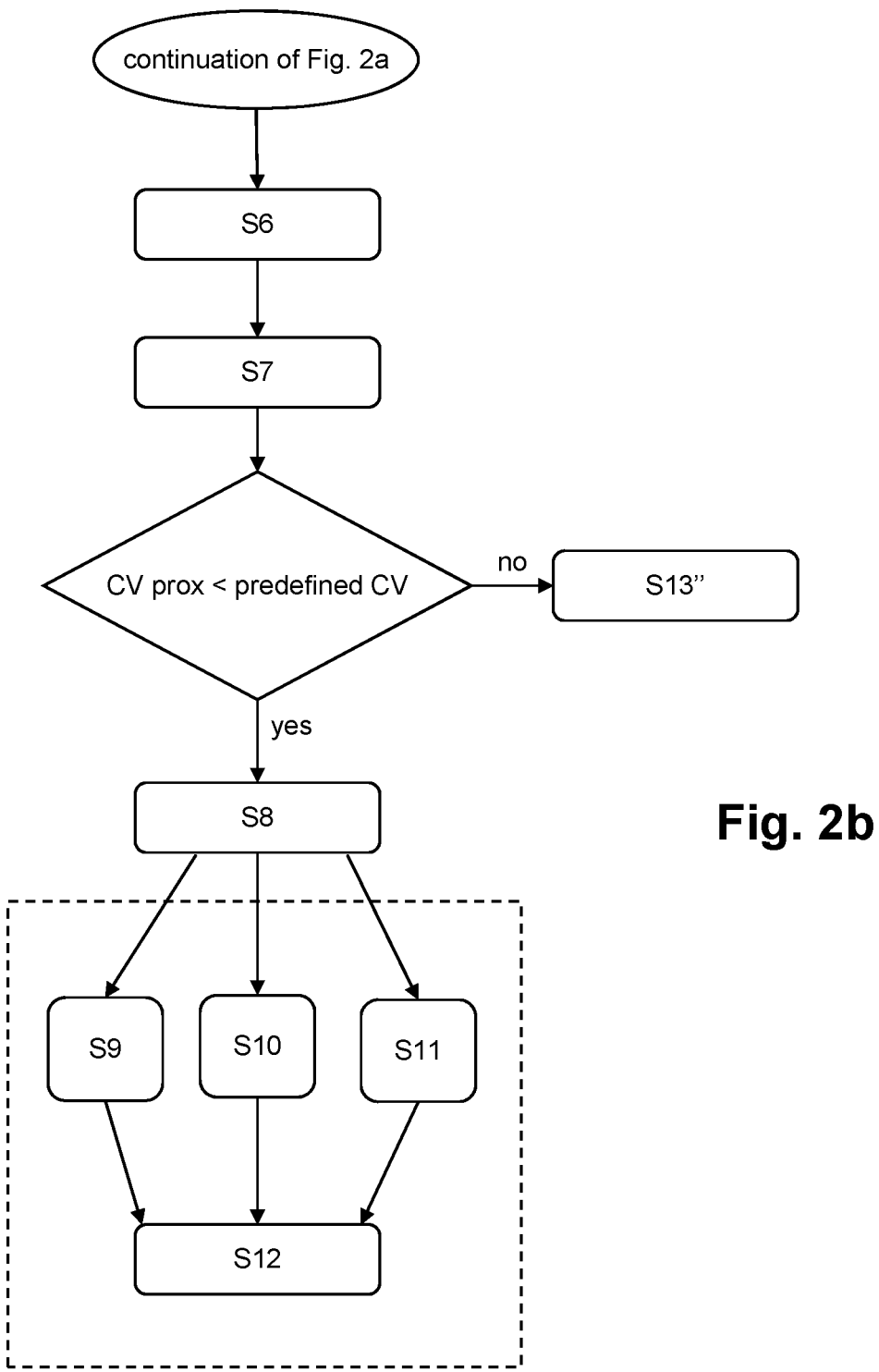
FIG. 2b shows a flow chart continuing the flow chart of FIG. 2a for illustrating the remaining portion of the method for emergency responses by evaluating media data according to the second embodiment of the invention.

FIGS. 2a and 2b show a flowchart of the method for emergency responses by evaluating media data according to another embodiment of the invention. As described in FIG. 1, a person first takes a picture of a possible emergency-relevant object in step S1. The person does not recognize the cause of the emergency relevant object but is concerned that it could be a major emergency. For example, the person sees smoke but does not recognize the cause of the smoke. The person now sends the picture with the emergency relevant object on it together with the metadata of the picture to a responsible appropriate authority (FIG. 7 illustrates an example of such data that may be sent by the person using the person's communication device).

If the position data of the image has been transmitted to the appropriate authority, the authority can use suitable databases to find out, whether incidents in the proximity of these position data are already recorded in the database. In step S1a, for example, an emergency database is searched for similar incidents. If the appropriate authority finds an incident in the immediate proximity of the position data of the image, it assigns a confidence value to it in step S1b. For example, if an emergency database is not available, the appropriate authority can also use social media network databases to search for incidents in the immediate proximity of the image position and assigns them a confidence value S1a', S1b'. This search for already known incidents in the immediate proximity of the image position is optional and does not necessarily have to be performed. also, the individual steps S1a, S1b, S1a' and S1b' can either run in parallel or one after the other.

The appropriate authority tries to determine and classify the emergency relevant object or objects on the image according to step S2. This determination can occur via at least one computer device of the appropriate authority (e.g. a server), for example. If this succeeds, a confidence value is assigned to the emergency relevant object in step S3. This confidence value indicates how likely it is that the emergency relevant object really is one. This value is then compared with a previously defined value. If the assigned confidence value for the emergency relevant object CV ero is lower than the predefined value, then the appropriate authority will store the incident as a standard incident together with the image data in an emergency database and terminate the process and the method according to step S13. However, if the assigned confidence value CV ero is higher than the previously defined value, then an attempt is made to determine the position of the emergency relevant object in step S4. If no position can be determined for the object, it is assigned a location confidence value CV L ero of 0.

However, according to step S5, if the location confidence value CV L ero is 0 or lower than a predefined value, the appropriate authority device can store a standard incident together with the image data and the confidence value for the emergency relevant object in an emergency database and the method will be terminated according to step S13'. However, there is also the option that if the location confidence value is lower than the predefined value, the person who sent the image to the appropriate authority can be contacted and can be asked for another picture. A second image can be taken at a certain distance from the location of the first image according to step S5'. On this second picture, of course, the emergency relevant object should be visible. Subsequently, the appropriate authority tries to recognize the object on this image again, and also tries to locate the object. The appropriate authority device therefore can use other methods for the computation of the location than it did before. If now a determination of the location succeeds together with a location confidence value which is higher than the predefined one, then the method is continued. If no determination of the location succeeds or if the location confidence value is still too low, the method is ended according to step S13'.

However, if the location confidence value is higher than the predefined value, the appropriate authority device can try to find possible known incidents in the immediate proximity of the location of the emergency relevant object using an emergency database in which such incidents are stored. If this does not succeed, a proximity confidence value of 0 is assigned in step S6. On the other hand, if such a known incident is detected, a proximity confidence value CV prox is calculated for it according to step S7. If this value is greater than a predefined value, it means that there is already a known incident for which the image data matches. The appropriate authority device can therefore adds the image data as well as the confidence value for the emergency relevant object and the confidence value for the location of this object to the already known incident. After that, the method is ended according to step S13".

However, if the proximity confidence value CV prox is less than the predefined value, the appropriate authority will create a new incident with the image data and all available confidence values in step S8.

After a new incident is created by the appropriate authority, the appropriate authority determines whether houses or buildings are in the immediate proximity of the new incident using appropriate means such as databases, maps, etc. This means that from the buildings, if any, the new incident can be seen and can be confirmed. If such buildings are identified, the building owner or the residents can be contacted via the phone line and asked to verify the new incident according to step S9 here, an IVR (Interactive Voice Response) can be used, too.

Another possibility is that the appropriate authority device may automatically or semi-automatically take further appropriate actions to verify the new incident based on image data received from the person and calculated by the appropriate authority. For example, the appropriate authority device may perform a cell tower query for mobile devices of other persons in the proximity to the new incident. If mobile devices are found, the owner can be contacted and asked if he or she can verify the new incident in step S10. This can take place by means of a call SMS or by means of IVR.

Alternatively, or additionally, drones, helicopters or personnel can be sent to the location of the new incident to verify it in step S11. However, if the terrain is very inaccessible, it is probably more advisable to send a helicopter or drone. Whether a terrain is inaccessible or not can be determined by the appropriate authority, for example, again with the help of databases, maps or the like.

If the new incident can be verified by one of the aforementioned methods, the appropriate authority can automatically increase the priority of the new incident so that it can be processed preferentially or faster in step S12.

Figure 3:
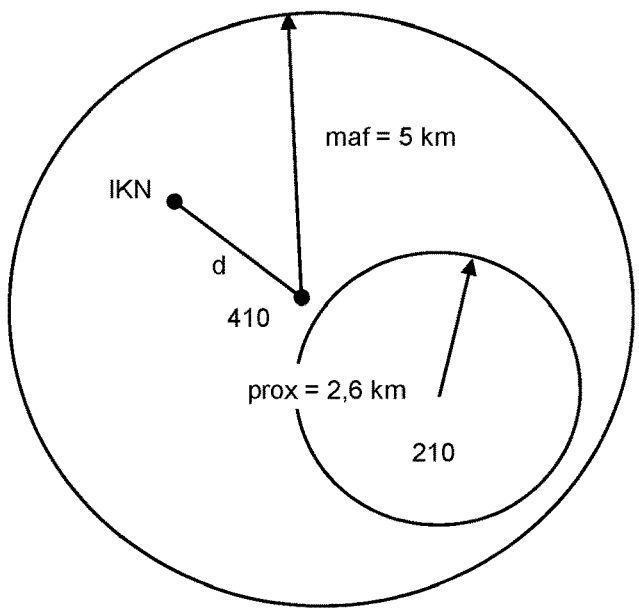
FIG. 3 shows a schematic illustration of location proximity relations according to an embodiment of the invention.

In FIG. 3 a schematic illustration of location proximity relations is shown.

Figure 4:
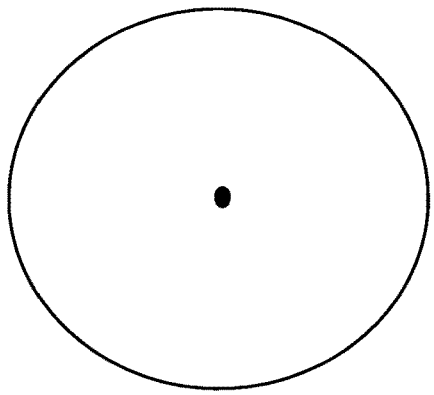
FIG. 4 shows a schematic illustration of a standard search area for known incidences according to an embodiment of the invention.

FIG. 4 shows a schematic illustration of a standard search area for known incidences. As can be seen, the search area is circular since any direction of the camera position can be considered. This is the standard area, for example, when there is no other data on the position of the camera or the captured image.

Figure 5:
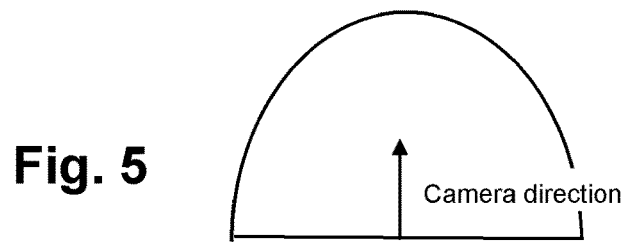
FIG. 5 shows a schematic illustration of a search area for known incidences when the camera direction is known according to an embodiment of the invention.

FIG. 5 shows a schematic illustration of a search area for known incidences when the camera direction of the electronic device is known. Thus, the circle of FIG. 4 can be reduced to a semicircle.

Figure 6:
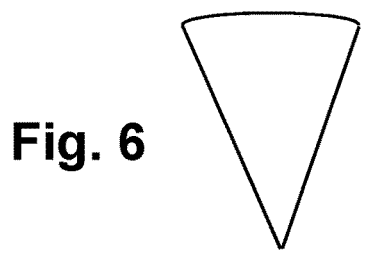
FIG. 6 shows a schematic illustration of a search area for known incidences when the camera direction and the camera's angle of vision is known according to an embodiment of the invention.

FIG. 6 shows a schematic illustration of a search area for known incidences when the camera direction and the camera's angle of vision is known. The search area becomes even more precise if the resolution or wide angle of the camera of the electronic device is also specified. If this is available from the image data, the search sector can be determined even more precisely.

1. Example of Calculation

Step S1a:
    Known incident is found.
    calculate first confidence value (distance d from known incident to location of "media data", Incident Type, "media data area"=wood etc.)
    distance d from known incident to location of "media data"
    d=0 means confidence value (cv1)=100
    d>media data area factor (maf) means confidence value (cv1)=0 (e.g. forest maf=5 km, city maf=1 km)
    e.g. cv1=100−100 (d/maf)
    Relation Incident Type to "media data location classification", e.g. if "media data location classification"=wood (retrieved from maps or database)

For each media data area factor (e.g. wood, forest, meadow, grassland, town, etc.) a corresponding list will be used which contains related Incident Type (IT) with assigned confidence value (cv). The IT are taken from "Public Safety Communications Common Incident Types for Data Exchange" (Standard written by The APCO International Data Transfer Committee, http://www.apcostandards.org/). The assigned values are part of the invention and reflect the probability that an event (e.g. FIRE) can occur in the context (e.g. forest). The values in the list and also the events can be adjusted based on real events in the context.

e.g. media data area factor: forest
    IT: cv2
    FIRE: 100
    FIRE SMOKE: 100
    FIRE STRUCTURE: 80
    FIRE BRUSH: 50
    FIRE OTHER: 40
    FIRE*: 30
    Rest: 0
    first confidence value=(cv1+cv2)/2 or $$fcv = \frac{1}{n}\sum_{i=0}^{n} cv_i$$

2. Example of Calculation

In Step S3:
    E.g. emergency relevant object=Smoke
    Incident type: cv4
    IT: cv4
    FIRE SMOKE: 100
    FIRE: 90
    FIRE STRUCTURE: 80
    FIRE BRUSH: 50
    FIRE OTHER: 40
    FIRE*: 30
    Rest: 0
    emergency relevant object confidence value (CV ero) =returned method value (cv3)+cv4)/2 or $$CV\ ero = \frac{1}{n}\sum_{i=0}^{n} cv_i$$

Or without cv4=emergency relevant object confidence value=returned method value
    With method value here means the value, which is output with the automatic media data recognition, e.g. of emergency relevant objects.

3. Example of Calculation

Calculate proximity in which to search for a known incident.

If location confidence value and emergency relevant object confidence value are high, the search radius could be smaller and vice versa. Basis is the media data location. This time emergency relevant object confidence value will be used as weight factor (wf).

For the emergency relevant object confidence value as a weight factor, a list will be used:
Fire: 0.9
Smoke: 0.6 (since it is assumed that smoke is not stationary as e.g. fire)

Proximity (prox)=media data area factor (maf)−(media data area factor (maf)*location confidence value (CV L ero)*wf)/100

Example: maf=5 km; location confidence value=100; wf=0.9
prox=0.5 km, the search radius is the 0.5 km around the location of the emergency relevant object.

It has to be mentioned that it is possible, by considering the camera's angle of vision, to narrow down the 'search field' of the incident rather than using the location as the center and 'drawing' an imaginary circle to be used as the search sector.

Case Study Example

A group is hiking together in the forested mountains. Suddenly, a participant sees smoke coming out of a distant place. The area is far enough and as a result, particular details are not easily noticed. Hence, one cannot identify, if the smoke is due to a chimney of a house that is located there, someone doing construction work or a real fire.

The group knows that the risk of fire is very high at the moment and decides to report the observation. For this purpose, one participant takes media data in form of a picture of the situation with a smartphone. Together with GPS data in the meta data of the picture they send it to an appropriate authority (e.g. a Public Safety Answering Point, an Emergency service provider, etc.).

The appropriate authority checks if there is a known incident or an emergency in a certain proximity. The media data area (here picture area) is located in a forest (classified using a map database), so according to a predefined media data area factor (maf), a 5 km circle around the media data location (here picture location) is used as proximity.

The appropriate authority finds a known incident (IKN) 3 km (d=3 km) away with the Incident Type (IT) "FIRE SMOKE". Now a first confidence value is calculated:

cv1=100−100(d/paf)=100−100(3/5)=100−60=40 cv2=value of the incident type in list "forest"=100 first confidence value=(cv1+cv2)/2=(40+100)/2=70

In a next step with suitable (mathematical) procedures, the image and the contained objects will be classified. The procedure returns as an emergency relevant object "Smoke" with a probability of 90 (cv3=90). cv4 (cv4=value of incident type in the list "Smoke") is predefined and is only used if the first confidence value >50. Since cv3 is greater than 50, an emergency relevant object confidence value is calculated:

cv3=90 cv4=value of IT in list "Smoke"=100 emergency relevant object confidence value=(cv3+cv4)/2=(90+100)/2=95

Since the emergency relevant object confidence value is greater than 60 (predefined value), the next step will proceed.

In a next step with suitable (mathematical) procedures the position of the emergency relevant objects "Smoke" is determined. The procedure returns a location with a probability of 80 (location confidence value=80), since the value is greater than 65 (predefined), the next step will be proceeded.

The appropriate authority checks if there is a known incident (IKN) in a certain proximity (prox):

prox=paf−(maf*location confidence value*wf)/100 maf is known=5 km location confidence value=80 wf=weight factor based on emergency relevant object ("Smoke") from list=0.6 p=5 km−2.4 km=2.6 km

Thus, a 2.6 km circle around location of emergency relevant object is used as proximity.

This time no incident was found, therefore the assigned confidence value is zero. Since the confidence value is lower than 60, a new incident case with Incident Type (IT) based on emergency relevant object ("Smoke") will be created and then next step will be proceeded.

The appropriate authority checks if there is a building at the determined position and any mobile users nearby. Since there is no known building and no mobile user (the hiking group has moved away from the object) and no road nearby, a drone will be used to clarify if the smoke is caused by a fire. As the fire was confirmed by drone (e.g. by pilot) the priority of the incident will be raised, and all additional data (from the drone flight) will be added to the incident.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that as discussed herein the appropriate authority can refer to the appropriate authority's communication device or system that hosts a service. The system or device can include at least one communication device having a processor connected to a transceiver unit and a non-transitory computer readable medium. The device or system can be communicatively connected to user smart phones, user terminal devices, and other devices via at least one network as can be appreciated from the above.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for emergency responses by evaluating media data comprising:
   detecting a potential emergency related object in an area and capturing with an electronic device media data of the potential emergency related object and sending, the picture or the video to an appropriate authority device;
   determining and classifying, by the appropriate authority device, an emergency relevant object in the media data and assigning an emergency relevant object confidence value to the emergency relevant object, if no emergency relevant object is determined or the emergency relevant object confidence value is lower than a predefined value, adding, by the appropriate authority device a standard incident together with the media data to an emergency database, and ending the method; otherwise
   determining, a location of the emergency relevant object, if no location of the emergency relevant object is determined, assigning a location confidence value of zero; otherwise
   calculating, a location confidence value, if the location confidence value is zero or lower than a predefined value,
   creating, by the appropriate authority device, a new incident case and adding it together with the media data and all available confidence values to an emergency database and ending the method.

2. The method of claim 1, wherein the picture or the video is sent to the appropriate authority device together with metadata of the media data location.

3. The method of claim 1, the method also comprising:
   determining, by the appropriate authority device, if a known incident in a certain proximity to the location of the emergency relevant object is present on the basis of comparative data from an emergency database, if no known incident is determined, assigning a proximity confidence value of zero, and
   creating, by the appropriate authority, a new incident case and adding it together with the media data and all available confidence values to an emergency database and ending the method.

4. The method of claim 3, the method further comprising:
   after the determining, by the appropriate authority device, if a known incident in a certain proximity to the location of the emergency relevant object is present on the basis of comparative data from an emergency database, if no known incident is determined, assigning a proximity confidence value of zero, adding, by the appropriate authority, the media data and all available confidence values to the already known incident in the emergency database and ending the method.

5. The method of claim 1, wherein the emergency relevant object is at least one of smoke, heat, fire, abnormal water level, flood, avalanche, storm, earthquake, riot, robbery, acts of war, tornado, wind pant or any other natural disaster.

6. The method of claim 1, wherein the area is at least one of forest, bushland, combustible vegetation, seaside, river side, dessert, mountain, grassland, lake side, town, city or wasteland.

7. The method of claim 2, wherein the metadata further comprising a proximity sector or an angle of view of the electronic device.

8. The method of claim 1, wherein the electrical device is a smartphone, tablet, smartwatch, smart glass or any other appropriate equipped device which is configured to send data to the appropriate authority device.

9. The method of claim 2, the method also comprising:
   after the detecting of the potential emergency related object in an area and capturing with an electronic device media data of the potential emergency related object and sending, the picture or the video to an appropriate authority device:
   determining, if a known incident in a certain proximity of the media data location is present on the basis of comparative data from an emergency database; and, if a known incident is present
   calculating, a first confidence value, otherwise, if no known incident is present, assigning a first confidence value of zero.

10. The method of claim 2, the method also comprising:
    after the detecting of the potential emergency related object in an area and capturing with an electronic device media data of the potential emergency related object and sending, the picture or the video to an appropriate authority device:
    checking, if a known incident in a certain proximity of the media data location is present on the basis of comparative data from a social media network database; and, if a known incident is present
    calculating, a second confidence value, otherwise, if no known incident is present assigning a second confidence value of zero.

11. The method of claim 10, wherein the checking and the calculating are performed in parallel or in sequence.

12. The method of claim 9, wherein the determining and the calculating are performed in parallel or in sequence.

13. The method of claim 1, comprising:
    adding and weighting the first confidence value, the second confidence value, the emergency relevant objects confidence value, the location of the emergency relevant objects confidence value and/or the proximity confidence value.

14. The method of claim 1, wherein, if the location confidence value is lower as a predefined value, the method further comprising:
    initiating a taking of a second media data of the emergency relevant object with a certain distance m to media data location calculating the location of the emergency relevant object using the second media data and/or a different calculation method.

15. The method of claim 1, wherein after creating the new incident case, the method further comprising:
    checking, by the appropriate authority device, using a map query, which buildings are in the vicinity of the new incident case and contacting and asking via call, SMS, Short Message Service, or IVR, Interactive Voice Response, if the owner of the building can confirm the new incident case; and/or
    determining, by the appropriate authority device, using a cell tower query, which mobile devices of other persons are in the vicinity of the new incident case and contacting and asking via call, SMS or IVR if the other persons can confirm the new incident case; and/or
    dispatching, by the appropriate authority device, a drone or personnel to confirm the new incident case; and/or;
    increasing, by the appropriate authority device, the priority of the new incident case, if the new incident is confirmed.

16. The method of claim 1, wherein all confident values are scaled to a value from 0 to 100, wherein a value of zero means no confidence and a value of 100 means extremely confident.

17. A system for emergency responses by evaluating media data, the system comprising:
an appropriate authority device communicatively connectable to at least one communication device;
the appropriate authority device configured to receive media data of a potential emergency related object from an electrical device that includes a picture or video and determine and classify an emergency relevant object in the media data and assign an emergency relevant object confidence value to the emergency relevant object, if no emergency relevant object is determined or the emergency relevant object confidence value is lower than a predefined value, the appropriate authority device adds a standard incident together with the media data to an emergency database, otherwise the appropriate authority device determines a location of the emergency relevant object, if no location of the emergency relevant object is determined, a location confidence value of zero is assigned;
otherwise a location confidence value is determined and if the location confidence value is zero or lower than a predefined value, a new incident case is created and added together with the media data and all available confidence values to an emergency database.

* * * * *